(12) United States Patent
Todd et al.

(10) Patent No.: US 11,550,834 B1
(45) Date of Patent: Jan. 10, 2023

(54) AUTOMATED ASSIGNMENT OF DATA SET VALUE VIA SEMANTIC MATCHING

(71) Applicant: EMC IP Holding Company LLC, Hopkinton, MA (US)

(72) Inventors: Stephen Todd, Shrewsbury, MA (US); David Stephen Reiner, Lexington, MA (US); Nihar Nanda, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 766 days.

(21) Appl. No.: 15/497,484

(22) Filed: Apr. 26, 2017

(51) Int. Cl.
*G06F 16/33* (2019.01)
*G06F 16/93* (2019.01)
*G06F 40/30* (2020.01)

(52) U.S. Cl.
CPC .......... *G06F 16/3344* (2019.01); *G06F 16/93* (2019.01); *G06F 40/30* (2020.01)

(58) Field of Classification Search
CPC ........... G06F 17/30684; G06F 16/3344; G06F 16/93; G06F 40/30
USPC .......................................................... 707/749
See application file for complete search history.

(56) References Cited

U.S. PATENT DOCUMENTS

| | | | |
|---|---|---|---|
| 6,715,145 B1 | 3/2004 | Bowman-Amuah | |
| 7,890,451 B2 | 2/2011 | Cancel et al. | |
| 7,970,729 B2 | 6/2011 | Cozzi | |
| 8,561,012 B1 | 10/2013 | Holler et al. | |
| 8,838,556 B1 | 9/2014 | Reiner et al. | |
| 9,141,908 B1 | 9/2015 | Reiner et al. | |
| 10,324,962 B1* | 6/2019 | Todd | G06F 16/338 |
| 2008/0052262 A1* | 2/2008 | Kosinov | G06F 16/9032 |
| 2013/0151423 A1* | 6/2013 | Schmidt | G06F 16/215 |
| | | | 705/306 |
| 2014/0052489 A1 | 2/2014 | Prieto | |
| 2014/0316824 A1* | 10/2014 | Tkatch | G06Q 40/08 |
| | | | 705/4 |
| 2017/0011428 A1* | 1/2017 | Guenther | G06Q 30/0271 |
| 2017/0371924 A1* | 12/2017 | Ding | G06F 16/2462 |
| 2018/0060306 A1* | 3/2018 | Starostin | G06F 17/271 |

(Continued)

OTHER PUBLICATIONS

U.S. Appl. No. 13/923,791, filed in the name of Stephen Todd et al. Jun. 21, 2013 and entitled "Data Analytics Computing Resource Provisioning."

(Continued)

*Primary Examiner* — Allen S Lin
(74) *Attorney, Agent, or Firm* — Ryan, Mason & Lewis, LLP

(57) ABSTRACT

An apparatus comprises a processing platform implementing a data set discovery engine and a data set valuation engine. The data set discovery engine is configured to generate data set similarity measures each relating a corresponding one of a plurality of data sets to one or more other ones of the plurality of data sets. The data set valuation engine is coupled to the data set discovery engine and configured to generate valuation measures for respective ones of at least a subset of the plurality of data sets based at least in part on respective ones of the data set similarity measures generated by the data set discovery engine. For example, the data set valuation engine may generate the valuation measure for a given data set as a function of valuation measures previously generated for respective other data sets determined to exhibit at least a threshold similarity to the given data set.

20 Claims, 9 Drawing Sheets

(56) References Cited

U.S. PATENT DOCUMENTS

2018/0165459 A1* 6/2018 Baldwin .................. G06F 21/60
2018/0226990 A1* 8/2018 Li ............................ G06F 3/064

OTHER PUBLICATIONS

U.S. Appl. No. 14/744,886, filed in the name of Marina Zeldin et al. Jun. 19, 2015 and entitled "Infrastructure Trust Index."

Wikipedia, "Value Chain," https://en.wikipedia.org/w/index.php?title=Value_chain&printable=yes, Jun. 6, 2016, 7 pages.

Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on AGILE, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

U.S. Appl. No. 14/487,520, filed in the name of Nihar Nanda et al. Sep. 16, 2014 and entitled "Data Set Virtual Neighborhood Characterization, Provisioning and Access."

E.J. Richardson et al., "Meta4: A Web Application for Sharing and Annotating Metagenomic Gene Predictions Using Web Services," Frontiers in Genetics, Methods Article, Sep. 5, 2013, pp. 1-6, vol. 4, Article 168.

U.S. Appl. No. 13/538,219, filed in the name of David Stephen Reiner et al. Jun. 29, 2012 and entitled "Dynamic Information Assembly for Designated Purpose Based on Suitability Reasoning Over Metadata."

U.S. Appl. No. 14/614,011, filed in the name of David Stephen Reiner et al. Feb. 4, 2015 and entitled "Integrating Compliance and Analytic Environments Through Data Lake Cross Currents."

U.S. Appl. No. 14/863,783, filed in the name of Stephen Todd et al. Sep. 24, 2015 and entitled "Unstructured Data Valuation."

U.S. Appl. No. 15/074,597, filed in the name of David Stephen Reiner et al. Mar. 18, 2016 and entitled "Data Set Discovery Engine Comprising Relativistic Retriever."

* cited by examiner

AUTOMATED ASSIGNMENT OF DATA SET VALUE VIA SEMANTIC MATCHING

FIELD

The field relates generally to information processing systems, and more particularly to processing of data sets in information processing systems.

BACKGROUND

Conventional techniques for information processing include document-oriented data processing tools such as Lucene. Other types of data processing tools are configured to utilize Java-based graph databases. However, these and other conventional tools are unduly limited in terms of the similarity measures that can be supported. For example, in some cases, such tools are restricted to use with particular frequency-based similarity measures. In addition, these and other conventional tools fail to support queries around, for example, suitability of data for particular purposes, goals, or roles in analytic processes. Yet another drawback of conventional tools is that such tools fail to provide functionality for automated valuation of data sets.

SUMMARY

Illustrative embodiments provide information processing systems configured for automated assignment of data set value via semantic matching.

In one embodiment, an apparatus comprises a processing platform implementing a data set discovery engine and a data set valuation engine. The data set discovery engine is configured to generate data set similarity measures each relating a corresponding one of a plurality of data sets to one or more other ones of the plurality of data sets. The data set valuation engine is coupled to the data set discovery engine and configured to generate valuation measures for respective ones of at least a subset of the plurality of data sets based at least in part on respective ones of the data set similarity measures generated by the data set discovery engine.

By way of example, the data set valuation engine may generate the valuation measure for a given data set as a function of valuation measures previously generated for respective other ones of the data sets determined to exhibit at least a threshold similarity to the given data set based at least in part on corresponding ones of the similarity measures generated by the data set discovery engine.

The data set similarity measure generated by the data set discovery engine for a given one of the data sets in some embodiments comprises at least one of distance between the given data set and each of one or more other ones of the data sets and a relationship among the given data set and one or more other ones of the data sets.

The data set discovery engine in some embodiments is configured to semantically examine a given data set using one or more semantic considerations derived from a semantic hierarchy of data sets and relationships to identify similar data sets. The data set valuation engine in a given such embodiment is illustratively configured to combine previously-determined valuation measures of the similar data sets to calculate the valuation measure for the given data set. For example, the data set valuation engine may be configured to combine the previously-determined valuation measures of the similar data sets by aggregating the valuation measures using associated weights.

These and other illustrative embodiments include, without limitation, apparatus, systems, methods, and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
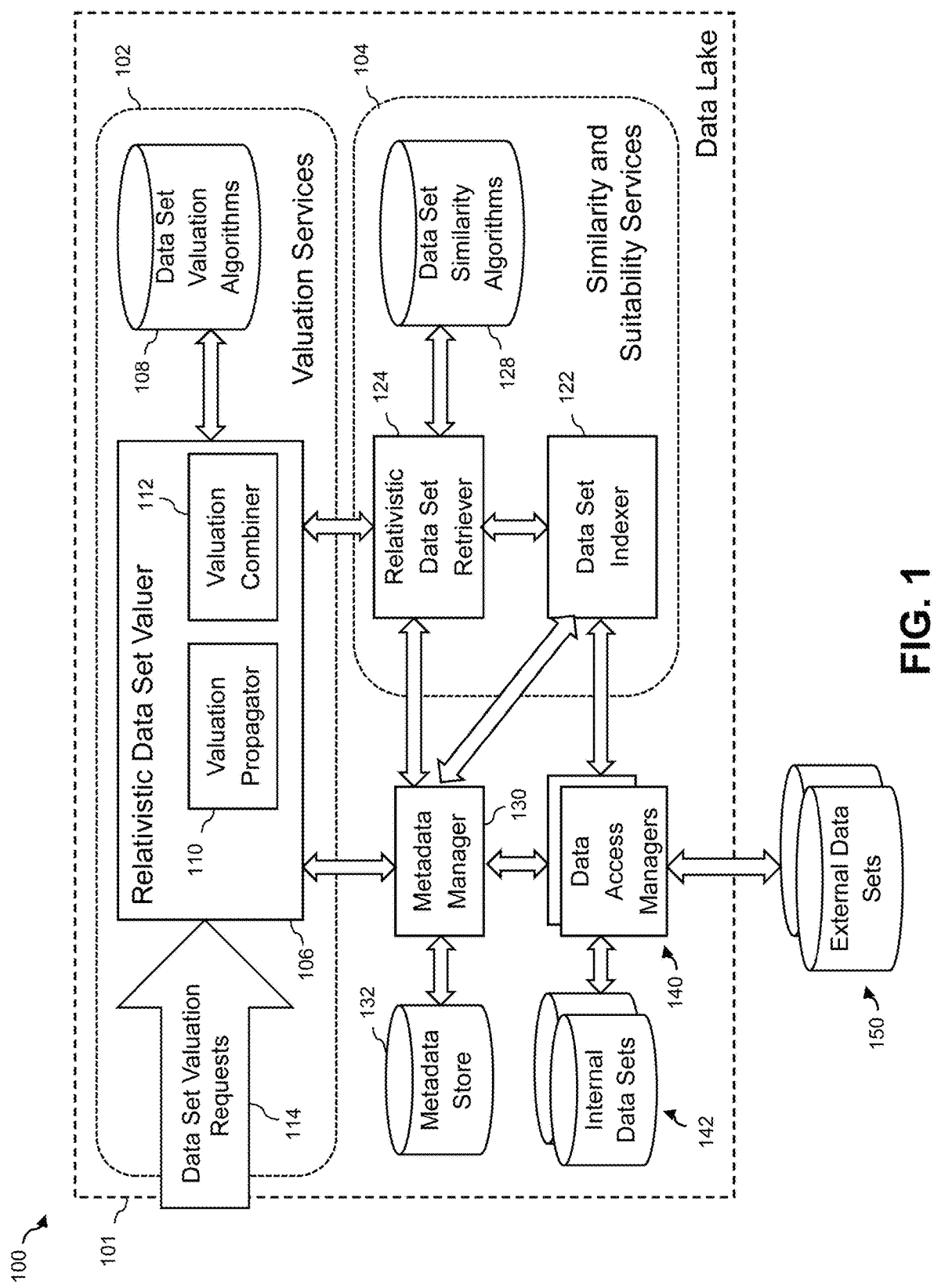
FIG. 1 is a block diagram of an information processing system configured for automated assignment of data set value via semantic matching in an illustrative embodiment.

FIG. 1 shows an information processing system 100 configured in accordance with an illustrative embodiment. The information processing system 100 is assumed to be built on at least one processing platform and provides functionality for data set discovery and associated data set valuation. In this embodiment, the system 100 more particularly comprises a data lake 101 having a valuation services component 102 and a similarity and suitability services component 104. The services components 102 and 104 of the data lake 101 may be viewed as illustrative examples of what are more generally referred to herein as a data set valuation engine and a data set discovery engine, respectively.

Although the services components 102 and 104 are shown as being encompassed by the data lake 101 in this embodiment, in other embodiments at least portions of one or both of the services components 102 and 104 can be implemented externally to the data lake 101. Also, the components 102 and 104 can be implemented in numerous alternative embodiments that do not involve the use of a data lake.

For purposes of further description below, the services components 102 and 104 will be referred to as data set valuation engine 102 and data set discovery engine 104, although it is again to be appreciated that other types and arrangements of data set related engines can be used in other embodiments.

The data set discovery engine 104 is configured to generate data set similarity measures each relating a corresponding one of a plurality of data sets to one or more other ones of the plurality of data sets.

The data set valuation engine 102 is coupled to the data set discovery engine 104 and configured to generate valuation measures for respective ones of at least a subset of the plurality of data sets based at least in part on respective ones of the data set similarity measures generated by the data set discovery engine 104.

The data set valuation engine 102 comprises a relativistic data set valuer 106 and a set of data set valuation algorithms 108. The relativistic data set valuer 106 comprises a valuation propagator 110 and a valuation combiner 112.

In the present embodiment, the data set valuation engine 102 illustratively receives data set valuation requests 114, at least a portion of which are assumed to originate from system entities outside the data lake 101. The data set valuation engine 102 is configured to generate a valuation measure for a given one of the data sets responsive to a received data set valuation request identifying that data set and a valuation context. The data set valuation request may be received via a valuation services application programming interface (API) of the data set valuation engine 102. For example, at least a subset of the data set valuation requests 114 may be received via such an API. The data set valuation engine 102 illustratively includes one or more additional APIs, such as an API with the data set discovery engine 104 through which additional data set valuation requests may be received. Numerous other arrangements are possible for initiating data set valuations in system 100. For example, instead of or in addition to performing data set valuation responsive to incoming data set valuation requests, the data set valuation engine 102 can be configured to perform data set valuations as part of a background process automatically applied to at least portions of the data sets of the data lake 101. It should also be noted that a given data set valuation request can be initiated by a user even though the request is presented through an API or other interface.

The data set similarity measure generated by the data set discovery engine 104 for a given one of the data sets may comprise at least one of distance between the given data set and each of one or more other ones of the data sets and a relationship among the given data set and one or more other ones of the data sets.

For example, the data set discovery engine 104 may be configured to semantically examine a given data set using one or more semantic considerations derived from a semantic hierarchy of data sets and relationships to identify similar data sets. The data set valuation engine 102 can then combine previously-determined valuation measures of the similar data sets to calculate the valuation measure for the given data set. This may involve combining the previously-determined valuation measures of the similar data sets by aggregating the valuation measures in the valuation combiner 112 using associated weights also provided by the data set discovery engine 104. It is to be appreciated, however, that other techniques for combining valuation measures of similar data sets may be used in the valuation combiner 112 to calculate the valuation measure for the given data set. Examples of alternative combining techniques include calculating a sum of squares of valuation measures of similar data sets, or determining a maximum of valuation measures of similar data sets. Numerous other combining techniques will be readily apparent to those skilled in the art.

In the above-described example of the operation of system 100, previously-determined valuation measures of data sets that are similar to a given data set are utilized to establish a valuation measure for the given data set. However, many other arrangements are possible. For example, a set of similar data sets can all be valued substantially simultaneously based on their respective degrees of similarity.

It is also possible that assigned valuation measures can be used as a similarity dimension for identifying similar data sets in the data set discovery engine 104. Accordingly, the data set discovery engine 104 can utilize valuation measures previously assigned to respective ones of the data sets by the data set valuation engine 102 to generate one or more of the data set similarity measures that are utilized in determining valuation measures for other data sets.

The data set discovery engine 104 in the present embodiment is therefore illustratively configured to utilize assigned data set valuation measure as an additional data set attribute to be considered in identifying similar data sets.

The valuation propagator 110 is illustratively configured for propagation of value based on newer data, which may include by way of example newly ingested or published data sets. Newer data can additionally or alternatively comprise newly-discovered legacy data, as well as other types of data.

As newly ingested or published data sets receive an assigned value, it is also possible to calculate data set value through propagation and modification of value across relationships among data sets. For example, a newer version of a data set, when introduced into the data lake 101, may be assigned higher value, while the older version, now deprecated, may see its value reduced. A derived data set that constitutes a sample of an original data set may be assigned a lower value, since it has less information. A derived data set that represents a cleaned, high quality version of an original data set may be assigned a higher value. The propagation of value via the valuation propagator 110 can be controlled at least in part using data set virtual neighborhoods to define the scope of consideration.

A given such data set virtual neighborhood in the present embodiment illustratively comprises a virtual grouping of a plurality of interrelated data sets determined at least in part based on one or more of metadata describing the data sets, content indexes related to the data sets, and content of the data sets. Other types and configurations of data set virtual neighborhoods can be used in other embodiments. Additional details regarding data set virtual neighborhoods can be found in U.S. patent application Ser. No. 14/487,520, filed Sep. 16, 2014 and entitled "Dataset Virtual Neighborhood Characterization, Provisioning, and Access," which is incorporated by reference herein.

In some embodiments, at least portions of the above-noted semantic hierarchy utilized by the data set discovery engine 104 to identify similar data sets are adjusted over time through the use of machine learning techniques. Such machine learning techniques illustratively utilize feedback derived at least in part from user interaction with particular data sets and their valuation measures. By way of example, machine learning or related approaches can be used to analyze dynamic changes in value of a given data set over all or part of the lifecycle to date of that data set. This can involve tagging data sets with their current position in the lifecycle or adjusting their values directly based on lifecycle position or history. Machine learning can therefore be used to improve valuation techniques and associated weights given some representation of usage outcomes. These and other machine learning arrangements can involve generating revised values and/or usage statistics as well as tagging of data set values.

As indicated previously, the data set valuation engine 102 is configured to generate the valuation measure for a given data set as a function of valuation measures previously generated for respective other ones of the data sets that are determined by the data set discovery engine 104 to be sufficiently similar to the given data set. The similar data sets are illustratively identified as those data sets that exhibit at least a threshold similarity to the given data set based at least in part on corresponding ones of the similarity measures generated by the data set discovery engine 104. The term "threshold" in this context and elsewhere herein is intended to be broadly construed so as to encompass a multi-dimensional threshold that potentially incorporates distinct dimensions associated with respective distinct ones of the above-noted semantic considerations derived from the semantic hierarchy of data sets and relationships. Comparison of a data set to such a threshold can therefore involve multiple comparisons along respective ones of the different dimensions of the threshold.

The data set discovery engine 104 includes a data set indexer 122 coupled to a relativistic data set retriever 124. The relativistic data set retriever 124 is configured to access a set of data set similarity algorithms 128.

The data set indexer 122 is configured to generate similarity indexes for a plurality of data sets, and the relativistic data set retriever 124 is configured to obtain a suitability template for a query and to execute the query against one or more of the similarity indexes based at least in part on the suitability template. A given one of the similarity indexes in this embodiment is assumed to comprise at least first and second auxiliary information generated from respective ones of at least first and second different similarity measures of a plurality of different similarity measures supported by the data set discovery engine 104.

The suitability template illustratively characterizes suitability for at least one of a particular purpose, a particular goal and a particular role in an analytic process or other type of process. The suitability template is associated with at least one target data set. The data set indexer 122 may be configured to generate similarity indexes for a plurality of target data sets each associated with one or more suitability templates. The suitability template in some embodiments is characterized at least in part by valuation measures of respective data sets.

As will be described in more detail below, the relativistic data set retriever 124 utilizes similarity indexes and associated relationships among data sets, as well as higher-order relationships including relationships among data set relationships themselves, in order to discover suitable data sets responsive to a query, and to support recommendation, navigation and other functionality relating to those data sets.

Information relating to the discovered data sets is utilized in conjunction with data set valuation as implemented in the data set valuation engine 102. For example, in some embodiments, the valuation process for a given data set can be performed using metadata relating to similar data sets. In arrangements of this type, it may not be necessary to retrieve the similar data sets themselves in order to perform the valuation process for the given data set.

It should be noted in this regard that terms such as "retriever," "retrieve" and "retrieval" as used herein are intended to be broadly construed, and should not be viewed as requiring actual reading of a data set from a memory or other storage device. For example, in some embodiments, information characterizing one or more discovered data sets is provided by the relativistic data set retriever 124 responsive to a query. Such characterizing information can include a pointer to a given data set, or other types of information sufficient to allow the data set itself or portions thereof to be read from a memory or other storage device, or otherwise obtained by a system entity that requires access to that data set.

The data set information provided by the data set retriever 124 can therefore in some embodiments include a given data set itself, or one or more designated portions of the given data set, or metadata of the given data set. Accordingly, references herein to retrieval or retrieving of data sets by one system entity should be understood to encompass arrangements in which, for example, that entity provides information sufficient to allow another system entity to perform actual reading of at least a portion of the data set or its associated metadata from a memory or other storage device.

For example, in some embodiments, the data set valuation engine 102 can query the relativistic data set retriever 124 of the data set discovery engine 104 to identify data sets that are similar to a given data set that is the subject of one of the data set valuation requests 114 received by the data set valuation engine 102. The relativistic data set retriever 124 can return the similar data sets and/or associated metadata such as valuation measures previously assigned to respective ones of the similar data sets. The valuation combiner 112 is configured to process those valuation measures, possibly using associated weights or other information relevant to the combining process, to calculate a valuation measure that is assigned to the given data set. The valuation measure is then returned to the system entity that generated the corresponding one of the data set valuation requests 114.

It is also possible that the data set valuation engine 102 can adjust valuation measures previously assigned to respective ones of the data sets. For example, the valuation measures can be adjusted based at least in part on current positions of respective data sets in their respective data set lifecycles. Numerous other factors may be used by the data set valuation engine 102 in adjusting previously-assigned valuation measures.

Illustrative embodiments can utilize data valuation techniques of the type described in U.S. patent application Ser. No. 14/863,783, filed Sep. 24, 2015 and entitled "Unstructured Data Valuation," which is incorporated by reference herein. Examples of such techniques will be described below in conjunction with FIGS. 6 and 7.

The system 100 in the FIG. 1 embodiment also includes a metadata manager 130 and a metadata store 132. The data set valuation engine 102 interacts with the metadata manager 130 to assign valuation measures to respective ones of the data sets by incorporating the valuation measures in metadata of the respective data sets. The valuation measure metadata is stored with other metadata of the data sets in the metadata store 132. Other embodiments may not have an explicit metadata store, and may handle metadata and/or valuation persistence differently.

The system 100 further comprises a set of data access managers 140 providing access to internal data sets 142 and external data sets 150. The internal data sets 142 illustratively comprise those data sets that have already been imported into the data lake 101 while the external data sets 150 illustratively comprise data sets that reside outside of the data lake 101. Data sets processed by the data set valuation engine 102 and data set discovery engine 104 illustratively include data sets from at least one of internal data sets 142 and external data sets 150.

For example, a given one of the data sets processed by the data set valuation engine 102 and the data set discovery engine 104 illustratively comprises one of the external data sets 150 that has not yet been imported or otherwise copied or migrated into the data lake 101, or made virtually accessible even if not physically imported.

In such an arrangement, a determination regarding whether or not to import the given data set into the data lake 101 may be based at least in part on its associated valuation measure. This can ensure that only those data sets meeting certain valuation measure criteria are actually imported into the data lake 101, although there may be contexts where such an approach is only applied to data sets of certain types, or from certain sources, etc.

This arrangement can facilitate the valuation of newly-discovered data, such as legacy data that is external to the data lake 101. In these and other contexts, automated valuation of such data based on semantic matching before import is used to determine whether or not an import is worthwhile. High value data may be worth importing, while lower value data may not be worth importing.

The data set indexer 122 and relativistic data set retriever 124 collectively support a broad range of queries, including queries in various federated settings possibly involving numerous distinct data set collections and other related information. Such queries are processed using not only data set content and identified relationships among the data sets, but also address additional relationships among the identified relationships, thereby providing significant enhancements in data set discovery functionality.

A given index configuration of the data set indexer 122 in this embodiment illustratively comprises similarity measures, suitability templates and other settings, although other types of index configurations can be used.

The data set discovery engine 104 comprising data set indexer 122 and relativistic data set retriever 124 is particularly well-suited for processing graphs, data collections or other data sets comprising very large numbers of data items. Such data sets often contain substantial amounts of potentially actionable information that is not captured or effectively utilized by existing tools. This information illustratively includes metadata on data sets, content in data sets, explicit and implicit relationships among data sets, and rich descriptions of these relationships. The metadata can illustratively include information such as lineage, provenance, security level, ownership, and history (e.g., cleaned).

The data set discovery engine 104 incorporates a software architecture and methodology configured to support accurate, efficient and deep data set discovery based on such information, including in some embodiments recommendation of data sets, thereby facilitating the determination of particular data sets suitable for a given purpose, goal or analytic role, where the term "analytic role" in this context refers to a role in an analytic process. Data sets suitable for roles in other types of processes can additionally or alternatively be determined. The use of the term "analytic role" in conjunction with the description of certain embodiments herein should therefore not be construed as limiting in any way.

For example, in some embodiments, the data set discovery engine 104 is capable of discovering, ranking and clustering data sets according to their similarity to a target specification or suitability for a given purpose, goal or analytic role. Its architecture allows the use of weighted, pluggable similarity measures, either universally or in a domain-specific fashion. It treats data sets and relationships among them in a unified manner, while providing a scalable infrastructure for automated reasoning and performance of high-level analytics processing over the discovered results.

As a more particular example, a given embodiment of the data set discovery engine 104 is configured to identify data sets similar to a given target data set, to discover relationships among the data sets, and possibly relationships among relationships, and to recommend data sets suitable for a given purpose, goal or analytic role. The discovered data sets are ranked by the degree of similarity to the target and this ranking is extended to suitability for the given purpose, goal, or role. Such an embodiment is further configured to support reasoning and analytics over the discovered results, treating data sets and relationships in a unified way, and to optimize, tune or otherwise adjust the similarity measures and their weightings based on user behavior in responding to recommendations.

As yet another example, data set metadata can be augmented with usage history. Such usage history can be indexed by or otherwise available to the data set indexer 122 in order to support searches that place weights on prior frequency of usage. The indexed usage history can be used to more heavily weight relevant data, popular data or under-utilized data, depending upon the particular needs of a similarity or suitability query.

A wide variety of additional or alternative data set discovery functionality can be provided in other embodiments. Such data set discovery functionality implements semantic matching utilized to support automated assignment of data set values.

The system 100 as described herein illustratively utilizes the assigned data set values to provide alerts or notifications to system users and/or to trigger other valuation-based actions within the system 100 or in other external systems. For example, assigned data set values can be compared to one or more thresholds to control triggering of such actions. The triggering of actions can additionally or alternatively be based on an amount of change or percentage of change in one or more data set values.

It is also to be appreciated that the particular arrangement of system components illustrated in FIG. 1 is exemplary only, and that numerous other arrangements of components may be used in other embodiments. For example, in other embodiments, functionality described herein as being associated with particular components of the system 100 may be implemented at least in part using additional or alternative components of the system 100.

As mentioned previously, the information processing system 100 is assumed in the present embodiment to be implemented on a given processing platform comprising one or more processing devices. Such a processing platform can comprise various combinations of physical and virtual resources. Illustrative examples of such processing platforms that may be used to implement at least portions of the system 100 will be described in more detail below in conjunction with FIGS. 8 and 9. These and other processing platforms in some embodiments are implemented using cloud infrastructure.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. Moreover, the particular implementation of the data set valuation engine 102 and data set discovery engine 104 in the FIG. 1 embodiment is illustrative only, and can be varied in other embodiments.

For example, other illustrative embodiments can be implemented in conjunction with a Data and Analytics Catalog (DAC) such as that provided as a component of the Analytic Insights Module from Dell EMC. Such embodiments can be configured to provide automated assignment of values to respective data sets tracked by the DAC. One or more APIs can be provided that permit a data set valuation engine to assign such values based on semantic matching as disclosed herein. Value assignment can occur before, during or after ingestion of data sets into an associated data lake or other storage system. The DAC in embodiments of this type is configured to serve as an asset manager, keeping track of usage patterns, transformations and modifications for the data sets. Values are illustratively assigned to respective data sets by attaching valuation metadata to the data set entry in the DAC.

As another example, other illustrative embodiments can be configured to implement automated assignment of data set value in the context of data lake cross currents, as described in U.S. patent application Ser. No. 14/614,011, filed Feb. 4, 2015 and entitled "Integrating Compliance and Analytic Environments Through Data Lake Cross Currents," which is incorporated by reference herein.

These and other embodiments can be adapted for utilization in a wide variety of different information processing contexts, including health care, bioinformatics, financial services, telecommunications, and other contexts characterized by the need for data valuation based on accurate, efficient and deep data set discovery functionality.

Figure 2:
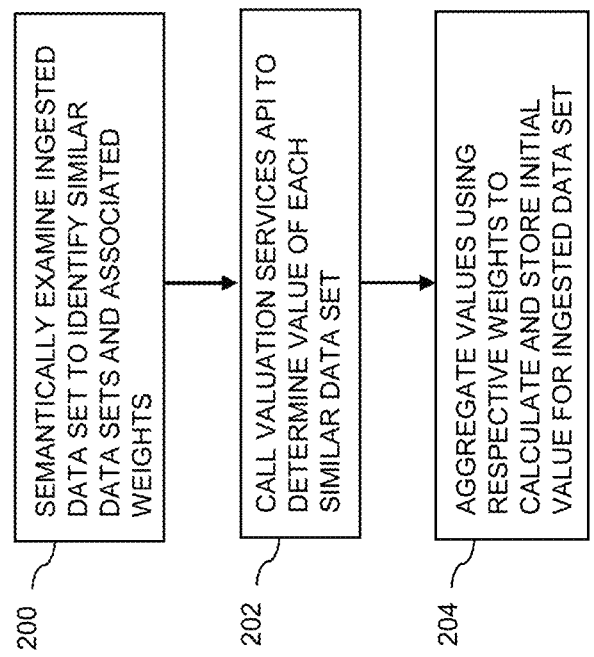
FIGS. 2 and 3 are flow diagrams of example processes for automated assignment of data set value via semantic matching in illustrative embodiments.
Figure 3:
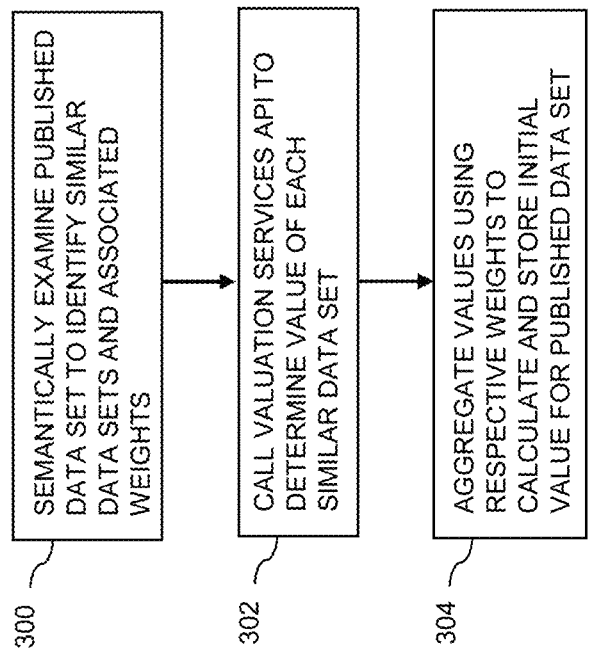

Flow diagrams of example processes for automated assignment of data set value via semantic matching in the system 100 are illustrated in FIGS. 2 and 3. These processes are performed by cooperative interaction of the data set valuation engine 102 and the data set discovery engine 104. A wide variety of additional or alternative processes can be used in other embodiments.

Referring initially to FIG. 2, the process as shown includes steps 200, 202 and 204, and is applied to an ingested data set. The ingested data set illustratively comprises a given one of the internal data sets 142 that was previously imported into the data lake 101.

The term "data set" as used herein is intended to be broadly construed. For example, a "data set" as the term is broadly used herein may be viewed, for example, as an abstraction of one or more data items, such as a table, document, file, query result, set of key-value pairs, index, storage block contents, in-memory caches or other data item or combinations thereof, where the given data set is characterized by properties as well as relationships to other data sets. These properties and relationships are captured by metadata that is associated with the data set in the system 100. For example, metadata can be used to describe data set characteristics such as ownership, type, content, schema, classification, matchable patterns, text analytics characterizations, security classifications, provenance, usability, quality, ad hoc user tags, and many others. Such metadata is illustratively stored in metadata store 132 under the control of the metadata manager 130.

Additional details regarding exemplary data sets and metadata characterizing those data sets, as well as techniques for reasoning over such metadata and possibly also corresponding data set content, can be found in U.S. Pat. No. 8,838,556, entitled "Managing Data Sets by Reasoning over Captured Metadata," and U.S. Pat. No. 9,141,908, entitled "Dynamic Information Assembly for Designated Purpose based on Suitability Reasoning over Metadata," both of which are incorporated by reference herein. Further details can be found in the above-cited U.S. patent application Ser. No. 14/487,520 entitled "Data Set Virtual Neighborhood Characterization, Provisioning and Access." It is to be appreciated, however, that the data sets and reasoning techniques described in these references are considered examples only, and need not be utilized in other embodiments.

In step 200, the ingested data set is semantically examined in the data set discovery engine 104 to identify one or more other data sets that are determined to be sufficiently similar to the ingested data sets. Weights associated with respective ones of the sufficiently similar data sets are also determined. In conjunction with the determination of one or more data sets that are similar to the ingested data set, information characterizing distances between data sets or relationships among data sets can additionally or alternatively be determined.

This part of the FIG. 2 process illustratively involves the use of similarity indexes generated by the data set indexer 122. For example, the similarity indexes illustratively comprise at least first and second auxiliary information generated from respective ones of at least first and second different similarity measures of a plurality of different similarity measures supported by the data set discovery engine 104.

The data set discovery engine 104 is therefore assumed to support a plurality of different similarity measures, which may include at least one frequency-based similarity measure and at least one non-frequency-based similarity measure. In some embodiments, an arbitrary set of two or more similarity measures selected from the plurality of different similarity measures are utilized in conjunction with execution of a query.

In step 202, a valuation services API is called to determine the value of each similar data set. For example, the data set discovery engine 104 illustratively calls a valuation services API of the data set valuation engine 102 to request a determination of the value of each data set that was determined to be similar to the ingested data set. The request can be implemented using one API call per data set to be valued. Alternatively, the request can be in the form of a single API call to value multiple data sets as a batch job. The value determination can in some cases be based at least in part on data set metadata that includes valuation measures previously assigned to those data sets by the data set valuation engine 102.

In step 204, the values of the respective similar data sets are aggregated using respective ones of the associated weights in order to calculate and store an initial value for the ingested data set. This determination of an initial value for the ingested data set is illustratively performed by the valuation combiner 112 of the data set valuation engine 102 utilizing the values of the respective similar data sets and their associated weights. For example, the initial value may be determined as a weighted sum of the values of the respective similar data sets, or using other functions of those values and weights. As indicated previously, other examples of alternative combining techniques include calculating a sum of squares of valuation measures of similar data sets, or determining a maximum of valuation measures of similar data sets, although numerous other combining techniques can be used.

With reference now to FIG. 3, the process as shown includes steps 300, 302 and 304, and is applied to a published data set. The published data set illustratively comprises a data set generated by a data scientist using a particular analytic workspace. Such a published data set may represent one of the internal data sets 142 generated within an analytic workspace of the data lake 101 or previously imported from an outside analytic workspace or other external source. Alternatively, the published data set could represent one of the external data sets 150 that is being considered for importation into the data lake 101, possibly provided to the system 100 along with an associated one of the data set valuation requests 114. The steps 300, 302 and 304 of the FIG. 3 process are similar to corresponding steps 200, 202 and 204 of the FIG. 2 process as previously described.

As noted above, numerous other types of data set valuation processes based on semantic matching can be implemented in system 100 through cooperative interaction of data set valuation engine 102 and the data set discovery engine 104.

Figure 4:
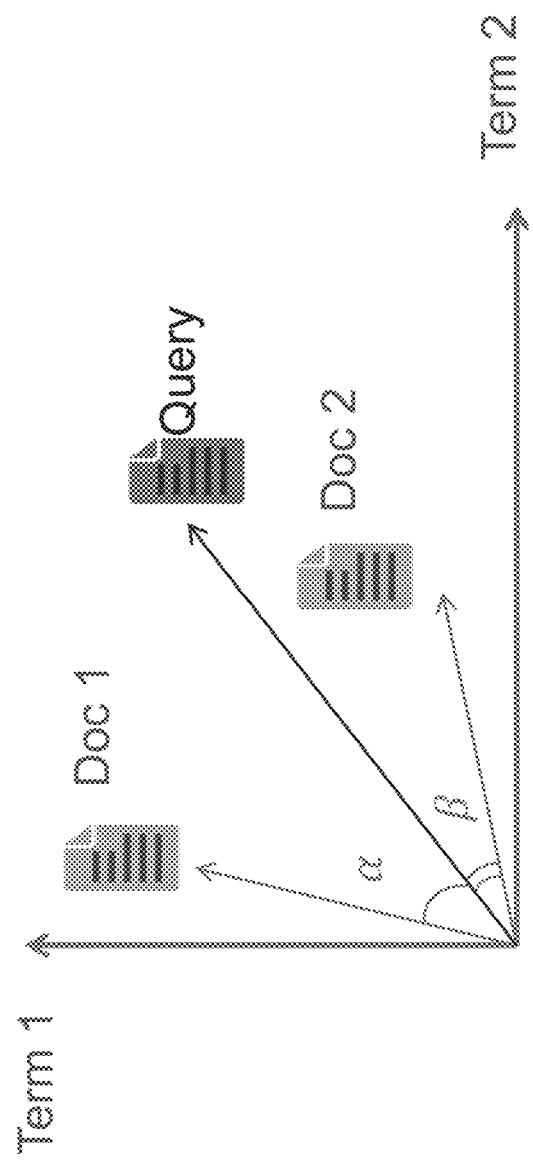
FIGS. 4 and 5 show different examples of similarity measures that are utilized in a data set discovery engine in an illustrative embodiment.
Figure 5:
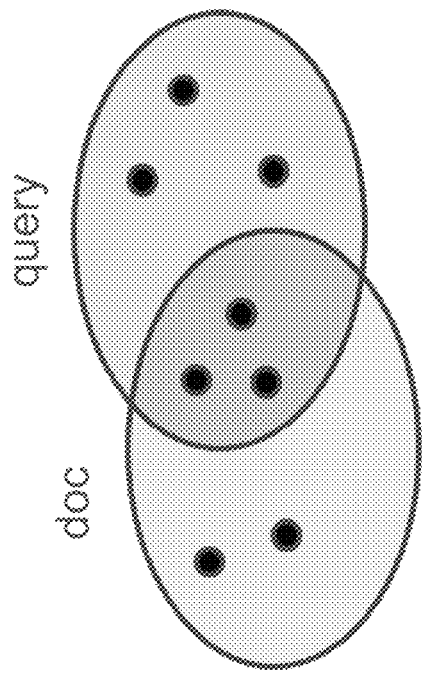

FIGS. 4 and 5 show different examples of similarity measures that may be utilized in the data set discovery engine 104. As mentioned previously, these similarity measures illustratively include at least one frequency-based similarity measure and at least one non-frequency-based similarity measure.

The frequency-based similarity measure may comprise, for example, a term frequency-inverse document frequency (TF-IDF) similarity measure. The use of an example TF-IDF similarity measure is illustrated in FIG. 4. The TF-IDF similarity measure is based on the notion of a "bag of words" comprising the most relevant terms extracted from a query document. The extracted terms are assigned numeric weights that serve as coordinates for the document in a vector space, in accordance with a vector space model (VSM). The weights are computed from normalized frequency of term occurrence, also referred to as TF-IDF quantities. Application of the measure is justified by the empirical observation that documents that are "close together" in this space tend to relate to the same topics. The TF-IDF quantities and the term weights are illustratively computed as follows:

$tf(t,d)$–number of times that term $t$ occurs in a document $d$ $idf(t) = \log(N/df(t))$, where $N$–number of documents in a collection $df(t)$–number of documents in a collection that contain term $t$ $w(t,d) = tf(t,d) \times idf(t)$ $w(t,d)$ is the weight assigned to the term $t$ These TF-IDF quantities and term weights are computed as part of the indexing process in the data set indexer 122. This computation is done for each term in the bag of words, so that a vector is obtained for each document. The TF-IDF degree of similarity of two documents can then be measured by a cosine between their respective vectors, as illustrated in FIG. 4. In this figure, a collection of documents includes documents denoted as Doc 1 and Doc 2. The bag of words includes two terms denoted Term 1 and Term 2. The similarity of a query document to Doc 1 is given by $\cos \alpha$, where $\alpha$ is the angle between the query document vector and the Doc 1 vector, and the similarity of the query document to Doc 2 is given by $\cos \beta$, where $\beta$ is the angle between the query document vector and the Doc 2 vector. In this case, Doc 2 is closer to the query document than Doc 1, because $\cos \beta < \cos \alpha$.

It is to be appreciated that a wide variety of other types of frequency-based similarity measures may be used in a given embodiment, in addition to or in place of a TF-IDF similarity measure, including probabilistic similarity measures such as BM25.

As noted above, the data set discovery engine 104 may also support at least one non-frequency-based similarity measure. One example of a non-frequency-based similarity measure comprises a Jaccard similarity measure, illustrated in FIG. 5. The Jaccard similarity measure computes the difference between two sets of data items, for instance, a set of terms or words from a document relative to a set of terms or words from a query, as the number of common elements of the two sets divided by the total number of distinct elements in the two sets. In the FIG. 5 example, a Jaccard similarity measure J(doc, query) is more particularly given by the count of the intersection of the set of terms or words in a document ("doc") with the set of terms or words in a query, divided by the count of the union of the set of terms or words in the document with the set of terms or words in the query. In the figure, the operator |•| denotes the count of the specified intersection ∩ or union ∪. As illustrated, the document includes five elements, the query includes six elements, and three of the elements are common to the document and the query, such that the Jaccard similarity measure is given by 3/8.

The Jaccard similarity measure computation may be performed approximately, using a random representative sampling of the two sets. Such an approximate computation is appropriate when the cardinalities of the sets are large, and may involve, for example, multiple applications of hash functions of a particular type ("MinHash") to elements of each of the sets. Other approaches use locality-sensitive hash (LSH) functions.

Again, the frequency-based and non-frequency-based similarity measures referred to above are examples only, and numerous other types of similarity measures can be used in other embodiments. The similarity measures in some embodiments are "pluggable" similarity measures in that functionality for supporting such measures can be provided to the data set indexer 122 via an API or other type of interface. Other arrangements for supporting one or more pluggable similarity measures can be used.

Accordingly, in some embodiments, the degree of similarity between a given pair of data sets is determined utilizing multiple similarity measures selected and weighted in an at least partially automated manner, possibly responsive to user input. Auxiliary information generated from respective ones of these similarity measures may be stored as part of a similarity index generated by the data set indexer 122. The generation of similarity indexes each comprising auxiliary information generated from multiple distinct similarity measures facilitates fast discovery of relevant data sets within the system 100. The particular similarity measures used in generation of a given similarity index can be dynamically adjusted by provision of additional or alternative pluggable similarity measures.

Although certain similarity measures are described herein with reference to data sets comprising documents, a wide variety of other data sets comprising alternative or alternative data items can be used.

Referring again to FIGS. 2 and 3, the semantic examination performed in steps 200 and 300 of the respective processes in some embodiments is aligned with a predetermined semantic hierarchy of data items and relationships. For example, such a semantic hierarchy may be as follows:

Content of data sets→metadata→relationships→similarity→suitability

In this example, the elements of the semantic hierarchy are arranged from a lowest level to a highest level, with the data sets being at the lowest level and the suitability being at the highest level. Other types of semantic hierarchies can be used in other embodiments.

An advantage of utilizing an explicit semantic hierarchy as part of the example processes of FIGS. 2 and 3 is that such an arrangement allows higher-level semantic considerations to be applied to searching for and retrieving data sets, thereby potentially providing more accurate results from the user's point of view.

As mentioned previously, data set suitability illustratively indicates suitability for a particular purpose, goal or analytic role. Suitability can be determined in some embodiments by first defining a data set template relevant for the given purpose, goal or analytic role. This may involve, for example, selecting a set of keywords in a target document, and assigning weights to the keywords based on their relative importance. Data sets can then be discovered and ranked according to their similarity to the template. For example, documents containing more of the specified keywords with higher weights are considered more suitable for the given purpose, goal or analytic role. Suitability may depend partly on data set metadata such as creation date, size, owner, security classification, content tags, as well as relationships with other data sets. Additionally or alternatively, various higher order relationships, also referred to herein as relationships among relationships, can be considered for determining suitability, as will be described in more detail below.

The suitability template in some embodiments is created from user-defined rules reflecting the purpose, goal or analytic role of required data sets. This may include, for example, identification of one or more appropriate training data sets for building analytic models. The suitability template can illustratively be viewed as a relativistic representation of one or more data sets. Such a suitability template can be utilized in conjunction with scoring and ranking of data sets, but can also be applied to historical targets. For example, a suitability template can be used not only to identify a path from a target data set A to one or more suitable data sets, but also a path from target data set A to similar target data sets B and C, and thereby to potentially suitable data sets associated with the target data sets B and C. Accordingly, a suitability template can support not only data set clustering but also target clustering, so as to allow navigation to be sequenced and mixed over both types of clustering.

Suitability templates in some embodiments are configured to enable discovery of data sets that may need to be restricted due to regulatory or compliance issues. For example, data sets may need to be restricted because they contain personal identification information (PII) or personal health information (PHI). Discovery of such data sets can be achieved using direct, derived and higher-order relationships along with similarity values. As a more particular example, a data set DS1 containing PII may be combined with one or more other data sets during an analysis process, producing a new data set DS2 that may be similar to the original DS1 by some similarity measures. It is very useful to know that DS2 is similar to DS1, since DS2 could then be restricted. The suitability aspect in this example, built on the underlying discovery of similarity of DS2 to DS1, is "suitability for tagging as sensitive content," which may lead to further restrictions on DS2 access and dissemination.

As noted above, a query may be executed against one or more of the similarity indexes based at least in part on the suitability template. For example, the relativistic data set retriever 124 may be configured to retrieve particular ones of the data sets in conjunction with execution of the query and to order the retrieved data sets in terms of their respective degrees of similarity to a given target data set associated with the suitability template. Again, references herein to retrieval of a given data set are intended to be broadly construed, and should not be viewed as requiring, for example, reading of the data set from a memory or other storage device. For example, a data set may be "retrieved" as that term is broadly used herein by providing a pointer to the data set or by providing other types of information sufficient to allow the data set, portions thereof or associated metadata to be read from a memory or other storage device.

Additionally or alternatively, the relativistic data set retriever 124 may be configured to identify relationships among retrieved data sets, as well as relationships among those relationships, in conjunction with execution of the query.

The relativistic data set retriever 124 in some embodiments is also illustratively configured to permit a user to navigate the retrieved data sets in accordance with the identified relationships and one or more additional relationships. These one or more additional relationships can include, for example, other relationships among the retrieved data sets and other data sets, or other relationships that the other data sets participate in, as well as various combinations of these and other relationships.

Such arrangements advantageously facilitate and augment user reasoning over relationships, as well as identification of similarities and other correlations among relationships based on their descriptions.

The identified relationships are illustratively determined at least in part based on similarity of a target data set associated with the suitability template to one or more other target data sets associated with one or more other suitability templates.

The suitability template may be used in some embodiments to determine one or more of the similarity measures. For example, in some embodiments, at least one of the first and second similarity measures used to generate respective first and second auxiliary information referred to in the context of steps 200 and 300 above is automatically selected based at least in part on the suitability template.

The first and second similarity measures in some embodiments have respective first and second weights assigned thereto. Such assigned weights are taken into account by the relativistic data set retriever 124 in recommending in conjunction with execution of the query one or more of the data sets that exhibit a specified degree of similarity to at least one target data set associated with the suitability template.

At least one of the similarity measures and at least one of the weights assigned to the respective similarity measures are adjusted over time based at least in part on user selection of particular data sets recommended by the relativistic data set retriever 124. A variety of additional or alternative types of user interaction with recommended data sets, such as user evaluation of one or more of the recommended data sets, can be used to control adjustments in one or more of the weights.

Such adjustments illustratively utilize one or more machine learning tools implemented within the system 100. For example, machine learning functionality may be implemented in the system 100 utilizing a machine learning tool such as the Machine Learning Library (MLlib) of Apache Spark™. Machine learning in some embodiments utilizes principal component analysis, clustering, classification or other types of analysis of discovered data sets. Such machine learning can be implemented internally or externally relative to the data set discovery engine comprising data set indexer 122 and relativistic data set retriever 124.

The relativistic data set retriever 124 in some embodiments is configured to utilize query-based filtering of data set collections with the aid of corresponding similarity indexes. In such an arrangement, the relativistic data set retriever 124 can perform comparisons by relevant similarity measures utilizing only those portions of a data set collection that remain after the filtering operation, thereby avoiding potentially prohibitive computational costs associated with exhaustive lookup of the entire collection.

The relativistic data set retriever 124 in some embodiments is configured to propagate a tag, a classification or another type of information from one of the data sets to another one of the data sets in conjunction with the execution of the query. The suitability template is illustratively a source for at least a portion of the tag, classification or other type of information propagated from one data set to another.

Accordingly, some embodiments are configured to support propagation of arbitrary tags and classifications from a data set to similar data sets. Examples are "contains PIP" and "must remain in country of origin" and "potentially relevant to investigation XYZ." Also, if target data sets associated with suitability templates are tagged or classified, then the tags and classifications may be propagated to "suitable" data sets.

As indicated above, the processes of FIGS. 2 and 3 can include additional steps not explicitly shown, such as retrieving particular ones of the data sets in conjunction with execution of the query, identifying relationships among the retrieved data sets and relationships among those relationships, and permitting a user to navigate the retrieved data sets in accordance with the identified relationships and one or more additional relationships.

For example, the semantic matching aspects of steps 200 and 300 of the flow diagrams of FIGS. 2 and 3 can in some embodiments be implemented in the form of a multi-stage workflow process. As a more particular example, a multi-stage workflow process for data set discovery using data set indexing and associated relativistic retrieval illustratively includes the following stages:

1. Data Preparation: Select one or more initial data set collections. Other data sets may be added incrementally later in the process.

2. Measure Preparation: Select initial similarity measures and their respective weights. Other similarity measures may be added incrementally later in the process, and the weights may be adjusted either manually or automatically.

3. Indexing: Index the data sets in the data collection, identify data set relationships, and compute auxiliary information. The auxiliary information is computed and stored in the index. Each instance of such auxiliary information is specific to a particular similarity measure. For example, first and second auxiliary information generated from respective first and second different similarity measures may be stored in the index. Descriptions of the relationships are also stored in the index.

4. Targeting: Formulate one or more suitability templates each associated with one or more target data sets. Data set content, rich metadata, interrelationships, and higher order relationships can be included in the suitability template. A suitability template illustratively provides a relativistic representation of suitable data sets.

5. Discovery: Query the data collection index to retrieve data sets similar to the one or more target data sets, which will be suitable to the intended purpose, goal or analytic role, as well as relationships among these data sets and relationships among the relationships. The query itself may comprise or otherwise identify one or more target data sets. Using the similarity index, filtering is performed in order to eliminate from consideration all data sets that are definitely not relevant to the query (e.g., those containing none of the relevant terms from the query). The remaining data sets are then processed using the similarity measures, and the results are ranked according to the obtained scores. The results may be presented to the data set valuation engine 102 in the descending order of degree of similarity to the suitability template. All the identified relationships between the relevant data sets may be simultaneously retrieved, possibly supplemented by higher-order relationships, also referred to herein as relationships among relationships. It should be noted that such higher-order relationships can include connections across multiple distinct hierarchical levels of relationships in some embodiments. Thus, for example, a relationship in one level of such a hierarchy can have a relationship to another relationship in the same level of the hierarchy, to another relationship in a different level of the hierarchy, and/or to an associated data set.

6. Exploration: Visualize and navigate the recommended data sets via interrelationships to gain understanding of their semantics and make a choice of data sets to use.

7. Optimization: Tune selection of similarity measures and relative weights based on feedback from user choices of recommended data sets.

It is to be appreciated that this is an example of one possible multi-stage workflow process, and numerous alternative arrangements of stages and processing operations may be used in other embodiments.

Additional details regarding semantic matching functionality that may be implemented in a data set discovery engine can be found in U.S. patent application Ser. No. 15/074,597, filed Mar. 18, 2016 and entitled "Data Set Discovery Engine Comprising Relativistic Retriever," which is incorporated by reference herein.

The particular processing operations and other system functionality described in conjunction with the flow diagrams of FIGS. 2 and 3 are presented by way of illustrative example only, and should not be construed as limiting in any way. Alternative embodiments can use other types of processing operations for data set discovery and data set valuation. For example, the ordering of the process steps may be varied in other embodiments, or certain steps may be performed at least in part concurrently with one another rather than serially.

It is to be appreciated that functionality such as that described in conjunction with the flow diagrams of FIGS. 2 and 3 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

Example data valuation aspects of illustrative embodiments will now be described in more detail with reference to FIGS. 6 and 7. In these embodiments, a set of domain-aware tokens are obtained for a given data set, and a value is computed for the given data set as a function of the set of domain-aware tokens and a given context of interest. The computed value represents a valuation of the given data set for the given context of interest. Such operations are illustratively performed in a data set valuation engine such as data set valuation engine 102 previously described in conjunction with the embodiment of FIG. 1.

The domain-aware tokens illustratively comprise metadata or other information relating to one or more data sets that are determined via semantic matching to be similar to a given data set being valued.

Figure 6:
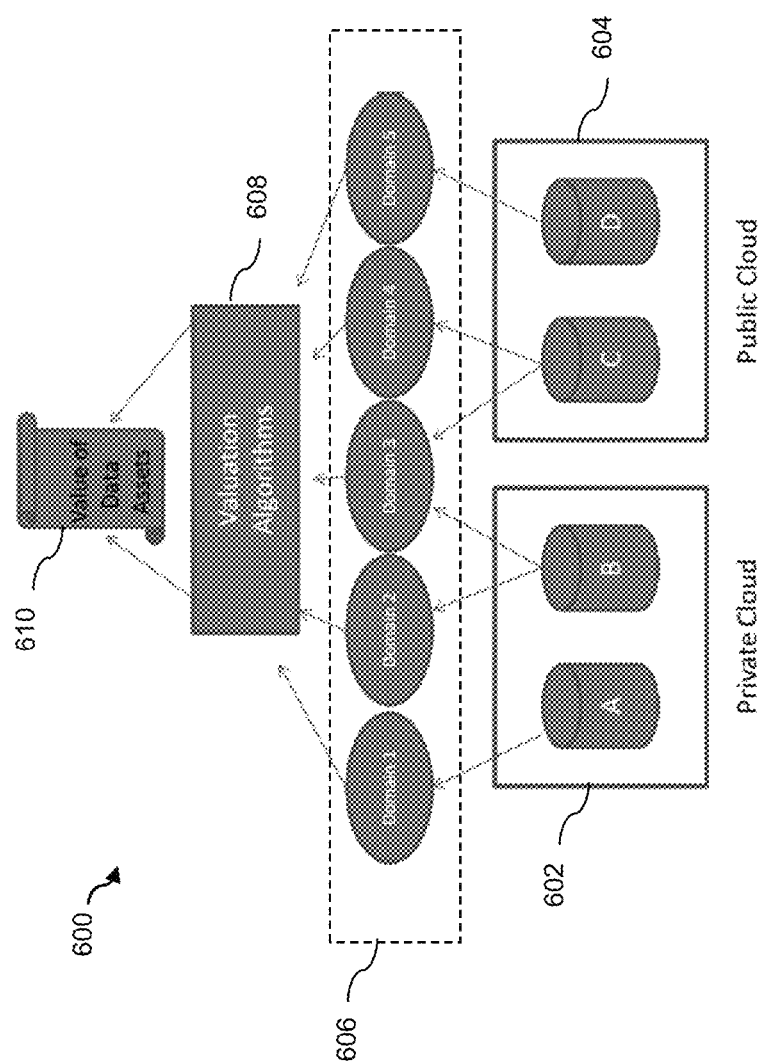
FIGS. 6 and 7 show different examples of data set valuation techniques utilized in a data set valuation engine in an illustrative embodiment.

Referring now to FIG. 6, an information processing system 600 comprises a private cloud 602 and a public cloud 604. The private cloud 602 comprises data repositories A and B, and the public cloud 604 comprises data repositories C and D. It is assumed that the data repositories A, B, C and D are illustratively part of a data lake of a corporation or other entity, such as the data lake 101 in the embodiment of FIG. 1. Each of the data repositories A, B, C and D stores a plurality of data sets that may be assigned values in an automated manner via semantic matching techniques of the type described herein. The data repositories A, B, C and D may comprise respective data stores.

The private cloud 602 illustratively comprises an internal or enterprise cloud, residing on a corporation's intranet or corporation-hosted data center, where the data is protected behind a firewall and the infrastructure is managed by the corporation.

The public cloud 604 illustratively comprises multi-tenant cloud infrastructure that is not managed by any of the tenants but rather by a third party provider and where data for each tenant is stored on infrastructure shared by the multiple tenants.

The combination of private cloud 602 and public cloud 604 is an example of what is typically referred to as a hybrid cloud.

It will be assumed for further description below that the data sets to be subject to automated valuation via semantic matching are respective documents stored in the data repositories A, B, C and D, although it is to be appreciated that the valuation techniques described can be applied to a wide variety of other types of data sets. Such data sets are also referred to as "data assets" in these embodiments.

Assume that the documents stored in data repositories A, B, C and D are processed via semantic matching using a data set discovery engine such as data set discovery engine 104 as previously described herein to generate domain-aware tokens for multiple domains 606, also denoted as Domain 1 through Domain 5. As noted above, a given such domain-aware token can comprise metadata or other information relating to one or more data sets that are determined via semantic matching to be similar to a given data set being valued. Such metadata illustratively includes an identifier of the document for which the token was generated and additionally includes identifiers of the similar data sets. The domain or domains of a given domain-aware token can comprise, for example, one or more distinct subject matter domains such as legal, finance, and many others.

The domain-aware tokens are provided to valuation algorithms 608. A different valuation algorithm may be used for each context. A value V is returned for each document based on the corresponding domain-aware tokens that are provided to the valuation algorithms 608. Multiple instances of these computed data set values are collectively denoted by reference numeral 610 in FIG. 6.

The valuation algorithms 608 illustratively correspond to at least a subset of the data set valuation algorithms 108 of the FIG. 1 embodiment, and may be accessed via a relativistic data set valuer such as relativistic data set valuer 106. Although not explicitly shown in the embodiments of FIGS. 6 and 7, one or both of a valuation propagator and a valuation combiner similar to respective valuation propagator 110 and valuation combiner 112 of FIG. 1 can be utilized in conjunction with the valuation algorithms 608. The valuation algorithms 608 can therefore comprise a set of base algorithms that generate intermediate valuation results that are acted upon by a valuation propagator and/or a valuation combiner.

Assume by way of example that each value V of content c for context x is calculated by the valuation algorithms 608 as follows:

$$V(c,x)=f(\{\text{outside-factors}\},\{\text{domain-specific-tokens}\},\{\text{domain-specific-token-metadata}\})$$

where f( ) represents a function, and where domain-specific-token-metadata can be a computed value from the tokens. One example of domain-specific-token-metadata is a distance between two tokens. For example, the distance may be a cosine distance based on two vectorized tokens which illustrates how closely the two tokens are semantically related. Metadata may also be system type metadata (e.g., time, date, etc. associated with the system doing the computations, as well as document identifiers for the tokens as mentioned above) and/or user-generated (custom) metadata. Outside factors illustratively include the context provided by the user (or other system) using the system 600.

Figure 7:
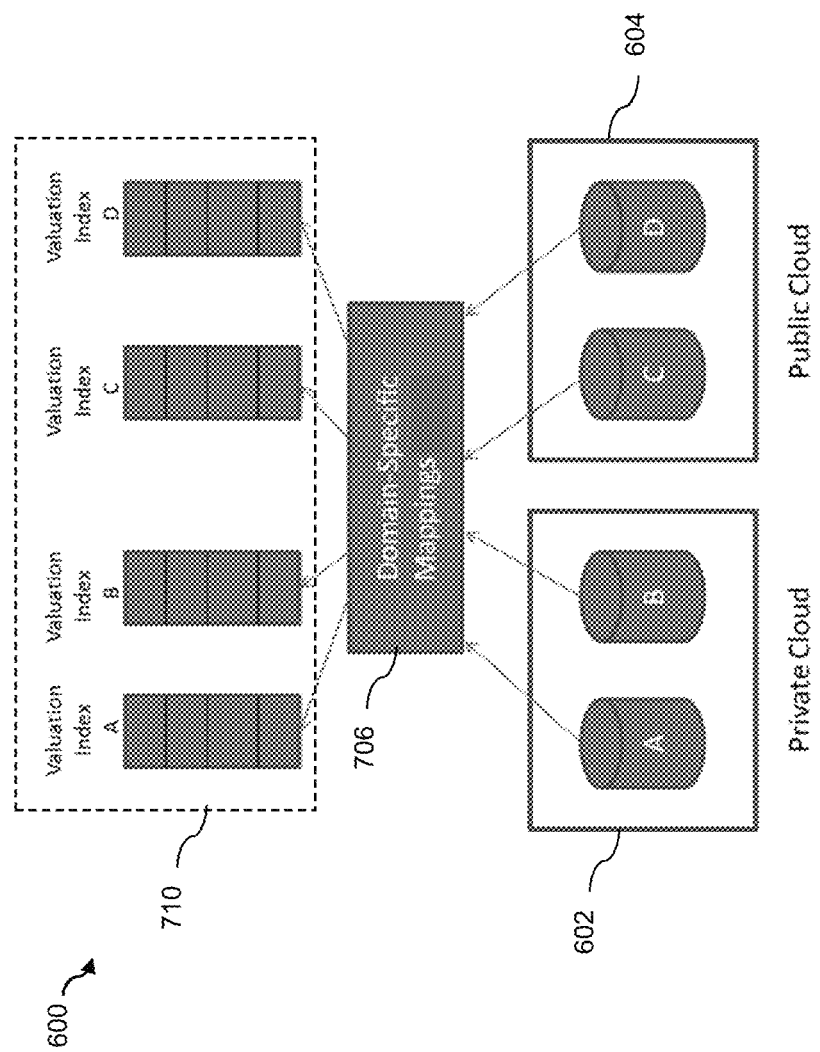

As illustrated in FIG. 7, valuation indexes 710 are generated using domain-specific mappings 706 corresponding to respective ones of the domains 606. For example, a given valuation index for a document from data repository A is illustratively generated based on the corresponding domain-specific-token-metadata and associated outside factors. The valuation index allows the re-evaluation of the value V of content c for each of a plurality of instances of context x.

As a quantitative example of computing a value V of content c, assume a set of values for a context x for a given domain-specific training set of n-skip-k-grams. First, calculate a cosine distance between each n-skip-k-gram in the content and the training set. Next, for each n-skip-k-gram, take the highest scoring cosine distance (i.e., the most similar construct) and add them up. Each individual value in the training set may have a multiplier that depends on one or more outside factors. For example, when there is a major security breach in the industry, it might give certain values a boost factor.

In the above quantitative example, a large document with a high number of n-skip-k-grams may return a high value V based on more cosine distances being summed up. However, a small document with more similar constructs scoring higher cosine distances may also return a high value V.

Valuation algorithms 608 in some embodiments are not static since the valuation of content can depend on a wide variety of rapidly-changing outside factors (e.g., changing context). As a result, illustrative embodiments can be configured to build valuation indexes from the extracted domain-aware tokens that are re-evaluated when valuation parameters change. Instead of re-processing the content, this re-evaluation phase can work directly against one or more of the indexes.

In the FIG. 7 embodiment, valuation indexes 710 are created for documents from respective ones of the repositories A, B, C and D. Each index for a given document includes the values V calculated for the given document as well as each domain-aware token associated with that document, including corresponding metadata. The valuation indexes 710 in this embodiment contain the initially-computed value V for a given document as well as re-evaluated (re-computed) values V for the given document as outside factors change (more generally, as valuation parameter changes).

As an illustrative example, a valuation index may store a relationship between a document and an outside factor, as well as the associated computed values. Thus, when the outside factor changes, all valuations that were computed with it are recomputed based on the individual valuations of the associated n-skip-k-grams retrieved from the index.

It is therefore to be appreciated that the values V(c,x) for each document as a function of the given context may have been previously calculated and stored in the corresponding one of the valuation indexes 710.

During the re-evaluation process in the FIG. 7 embodiment, if re-evaluation using an identical context yields a markedly different value result (e.g., a significant amount of new, valuable data has arrived for that context), a comparison against historical value statements can trigger event-based alerts or notifications using a variety of approaches (e.g., threshold crossed, percentage increase/decrease in value, etc.).

Additionally or alternatively, re-evaluation can lead to actions within the system, for instance, decisions to move data between the private cloud environment (e.g., the value of the content rises dramatically) and the public cloud environment (e.g., the value of the content decreases dramatically).

The features and functionality of the illustrative embodiments of FIGS. 6 and 7 are presented by way of example, and should not be construed as limiting in any way. For example, although valuation indexes are used in these embodiments, other embodiments do not require the use of such indexes.

Additional details regarding these and other data set valuation techniques suitable for use in illustrative embodiments are described in the above-cited U.S. patent application Ser. No. 14/863,783 entitled "Unstructured Data Valuation."

Illustrative embodiments are configured to provide a number of significant advantages relative to alternative approaches.

For example, these embodiments can provide rapid data set valuation in conjunction with ingestion or publishing of a data set. The automated assignment of data set value via semantic matching also facilitates accurate and efficient valuation of data sets in many other situations, such as those involving new data sets or legacy data sets.

Also, automated assignment of data set value via semantic matching in some embodiments avoids or eliminates inconsistencies or other undue variations in manual value assignments across similar data sets within a data lake.

In addition, the assigned values in illustrative embodiments take into account the impact on data set value of the relationships between and among data sets, such as version relationships and other types of similarity relationships.

Moreover, data valuation in some embodiments is performed with reference to the suitability of a data set for a particular purpose, a particular goal or a particular role in an analytic process or other type of process, including performance of tasks that may not have been anticipated, such as the pursuit of insights in a new area by a data scientist. For example, one or more task-specific values can be calculated and assigned to a given data set based on its suitability to the corresponding task or tasks. This may be done through reference to a hypothetical target data set. As more particular illustrations, data sets containing PII will have low value for tasks that require no PII in data sets, cleaned data sets will have low value for tasks that need original data including aberrations, and recent data sets will have higher value than old ones when short term trends are being analyzed in a task.

Some embodiments allow otherwise unseen business value of data sets in a data lake to be more easily discovered and exploited. Such arrangements can facilitate the extraction of value from legacy data and unused or underutilized data.

Another advantage of illustrative embodiments is that valuation measures can be automatically assigned to data sets in real time or near real time, thereby supporting data set valuation at the pace of data set ingestion.

In addition, instant data set valuation can be provided responsive to workspace publication. For example, as new data sets are published into a data lake from an analytic workspace, the techniques disclosed herein can be used to automatically and instantaneously associate value with these new data assets.

Some embodiments are configured to provide a common data valuation framework and associated alerts, notifications or other valuation-based actions across a wide variety of different ingest points to a data lake. This can include orchestrated "paved road" ingestion as well as "dirt road" ingestion done without formal orchestration.

Illustrative embodiments can facilitate valuation of a recently ingested, published or otherwise new data set in situations in which provenance of the new data set is unknown by considering data set similarity or suitability for purpose to propagate and modify existing data set values to the new data set.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
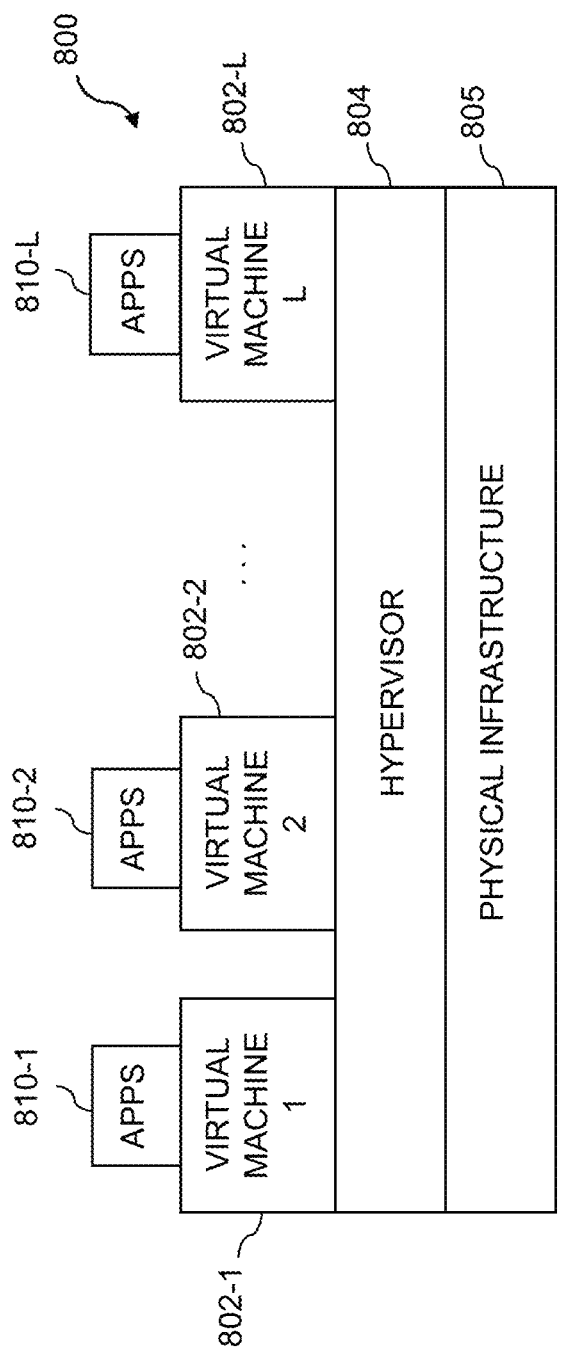
FIGS. 8 and 9 show examples of processing platforms that may be utilized to implement at least a portion of the FIG. 1 system.
Figure 9:
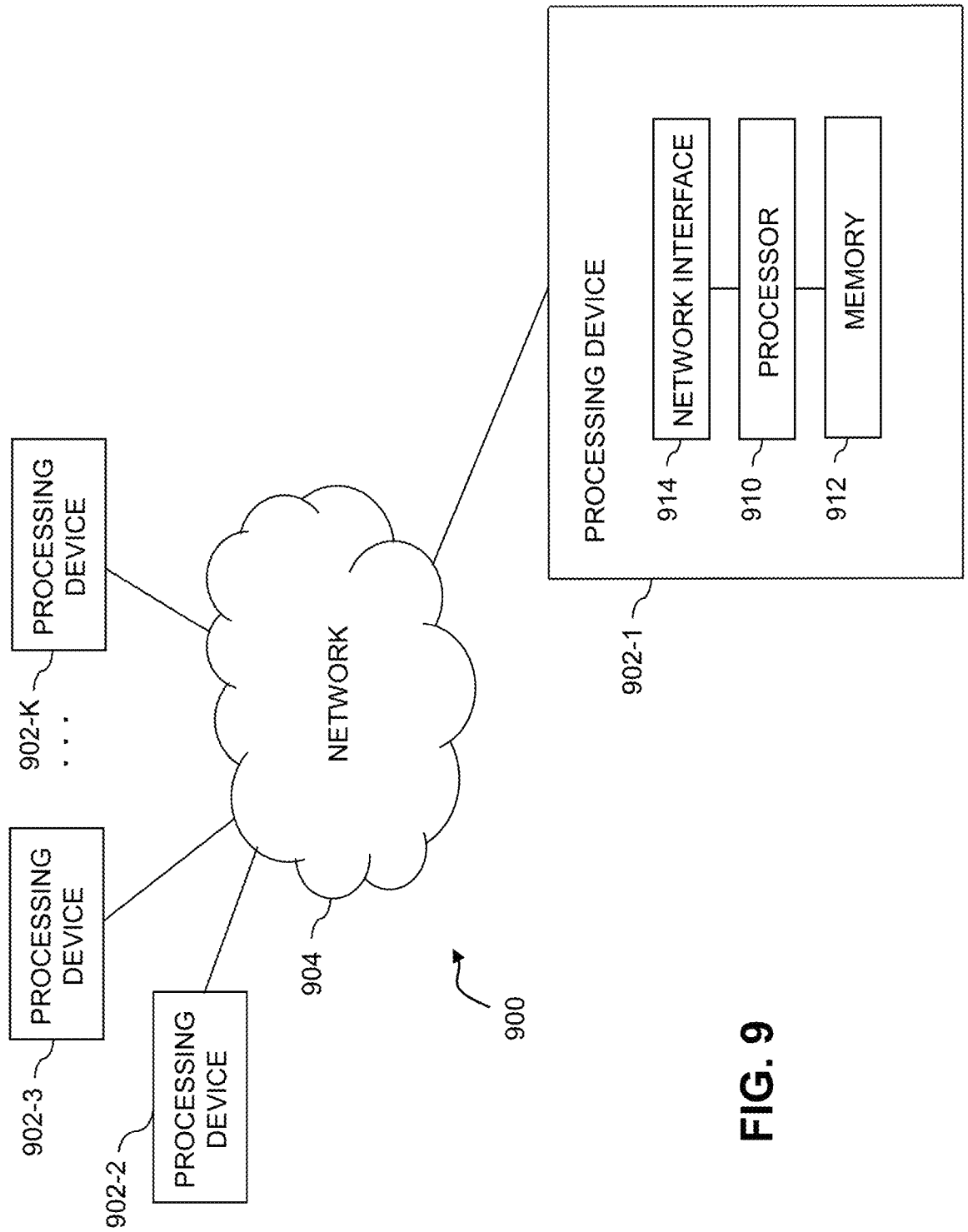

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 804 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement automated assignment of data set value via semantic matching as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of data set valuation engine 102 and data set discovery engine 104 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide automated data set valuation based on accurate, efficient and deep data set discovery functionality. Also, the particular configurations of system and device elements shown in the figures can be varied in other embodiments. Thus, for example, the particular type of data set discovery and valuation engines deployed in a given embodiment and their respective configurations may be varied. Other features of the illustrative embodiments such as similarity indexes, suitability templates and valuation techniques can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a processing platform implementing a data set discovery engine and a data set valuation engine;
the data set discovery engine being configured to generate data set similarity measures each relating a corresponding one of a plurality of data sets to one or more other ones of the plurality of data sets; and
the data set valuation engine being coupled to the data set discovery engine and configured to generate valuation measures for respective ones of at least a subset of the plurality of data sets based at least in part on respective ones of the data set similarity measures generated by the data set discovery engine;
the data set similarity measures comprising one or more distance-based similarity measures each measuring a distance between a given one of the plurality of data sets and another one of the plurality of data sets at least in part as a function of a first plurality of data items extracted from the given data set and a second plurality of data items extracted from the other one of the plurality of data sets;
wherein the data set discovery engine in generating the data set similarity measures is configured to semantically examine the given data set using one or more semantic considerations derived from a semantic hierarchy of data sets and relationships to identify similar data sets;
the valuation measures generated for respective ones of the data sets comprising respective quantitative values each representing a quantitative measure of a value of its corresponding data set;
wherein the data set valuation engine in generating the valuation measures is configured:
to generate, for the given data set, a valuation index, the valuation index being generated based at least in part on the given data set and domain-aware tokens associated with the given data set, each of the domain-aware tokens being generated for a corresponding context of interest and comprising information relating to one or more other ones of the data sets that are determined via the semantic examination to be similar to the given data set; and
to determine valuation measures for the given data set by evaluating the valuation index using one or more changing context factors;
wherein the data set valuation engine is configured to assign the valuation measures to respective ones of the data sets by incorporating the valuation measures in metadata of the respective data sets;

wherein the processing platform comprises one or more processing devices each comprising a processor coupled to a memory;

wherein the processing platform further implements at least a portion of a data lake providing one or more of the plurality of data sets for processing by the data set discovery engine and the data set valuation engine; and wherein at least one of the data sets processed by the data set discovery engine and the data set valuation engine comprises an external data set not yet imported into the data lake and further wherein import of the at least one data set into the data lake is controlled based at least in part on its associated valuation measure.

2. The apparatus of claim 1 wherein the data set valuation engine is configured to generate a valuation measure for the given data set responsive to a received data set valuation request identifying the given data set and values for the one or more changing context factors.

3. The apparatus of claim 2 wherein the data set valuation request is received via a valuation services application programming interface of the data set valuation engine.

4. The apparatus of claim 1 wherein the data set similarity measure generated by the data set discovery engine for at least one of the data sets comprises at least one of distance between the at least one data set and each of one or more other ones of the data sets and a relationship among the at least one data set and one or more other ones of the data sets.

5. The apparatus of claim 1 wherein the data set valuation engine is configured to combine previously-determined valuation measures of the data sets that are determined via the semantic examination to be similar to the given data set by aggregating the previously-determined valuation measures using associated weights.

6. The apparatus of claim 1 wherein at least portions of the semantic hierarchy are adjusted over time through machine learning based at least in part on user interaction with particular data sets and their valuation measures.

7. The apparatus of claim 1 wherein the data set valuation engine is configured to generate the valuation measure for at least one data set as a function of valuation measures previously generated for respective other ones of the data sets determined to exhibit at least a threshold similarity to the at least one data set based at least in part on corresponding ones of the similarity measures generated by the data set discovery engine.

8. The apparatus of claim 1 wherein the data set discovery engine is configured to utilize valuation measures previously assigned to respective ones of the data sets by the data set valuation engine to generate one or more of the data set similarity measures.

9. The apparatus of claim 1 wherein the data set discovery engine is configured:
to generate similarity indexes for the plurality of data sets; and
to obtain a suitability template for a query and to execute the query against one or more of the similarity indexes based at least in part on the suitability template;
wherein the suitability template characterizes suitability for at least one of a particular purpose, a particular goal and a particular role in a process;
wherein the suitability template is associated with at least one target data set and further wherein the data set discovery engine is configured to generate similarity indexes for a plurality of target data sets each associated with one or more suitability templates; and
wherein the suitability template is characterized at least in part by valuation measures of respective data sets.

10. The apparatus of claim 1 wherein the data set valuation engine is configured to adjust valuation measures of respective similar data sets identified by the data set discovery engine.

11. A method comprising:
generating data set similarity measures each relating a corresponding one of a plurality of data sets to one or more other ones of the plurality of data sets; and
generating valuation measures for respective ones of at least a subset of the plurality of data sets based at least in part on respective ones of the data set similarity measures;
the data set similarity measures comprising one or more distance-based similarity measures each measuring a distance between a given one of the plurality of data sets and another one of the plurality of data sets at least in part as a function of a first plurality of data items extracted from the given one of the plurality of data sets and a second plurality of data items extracted from the other one of the plurality of data sets;
the valuation measures generated for respective ones of the data sets comprising respective quantitative values each representing a quantitative measure of a value of its corresponding data set;
wherein the valuation measures are assigned to respective ones of the data sets by incorporating the valuation measures in metadata of the respective data sets;
wherein the generating steps further comprise:
semantically examining the given data set using one or more semantic considerations derived from a semantic hierarchy of data sets and relationships to identify similar data sets;
generating, for the given data set, a valuation index, the valuation index being generated based at least in part on the given data set and domain-aware tokens associated with the given data set, each of the domain-aware tokens being generated for a corresponding context of interest and comprising information relating to one or more other ones of the data sets that are determined via the semantic examination to be similar to the given data set; and
determining valuation measures for the given data set by evaluating the valuation index using one or more changing context factors; and
wherein the method is performed by a processing platform comprising one or more processing devices;
wherein the processing platform implements at least a portion of a data lake providing one or more of the plurality of data sets; and
wherein at least one of the data sets comprises an external data set not yet imported into the data lake and further wherein import of the at least one data set into the data lake is controlled based at least in part on its associated valuation measure.

12. The method of claim 11 wherein generating data set similarity measures comprises utilizing valuation measures previously assigned to respective ones of the data sets to generate one or more of the data set similarity measures.

13. The method of claim 11 wherein generating valuation measures comprises combining previously-determined valuation measures of data sets that are determined via the semantic examination to be similar to the given data set by aggregating the valuation measures using associated weights.

14. The method of claim 11 wherein at least portions of the semantic hierarchy are adjusted over time through machine learning based at least in part on user interaction with particular data sets and their valuation measures.

15. The method of claim 11 wherein a given valuation measure for the given data set is generated responsive to a received data set valuation request identifying the given data set and values for the one or more changing context factors.

16. A computer program product comprising a non-transitory processor-readable storage medium having one or more software programs embodied therein, wherein the one or more software programs when executed by at least one processing device of a processing platform cause the processing device:

to generate data set similarity measures each relating a corresponding one of a plurality of data sets to one or more other ones of the plurality of data sets; and to generate valuation measures for respective ones of at least a subset of the plurality of data sets based at least in part on respective ones of the data set similarity measures;

the data set similarity measures comprising one or more distance-based similarity measures each measuring a distance between a given one of the plurality of data sets and another one of the plurality of data sets at least in part as a function of a first plurality of data items extracted from the given one of the plurality of data sets and a second plurality of data items extracted from the other one of the plurality of data sets;

the valuation measures generated for respective ones of the data sets comprising respective quantitative values each representing a quantitative measure of a value of its corresponding data set;

wherein the valuation measures are assigned to respective ones of the data sets by incorporating the valuation measures in metadata of the respective data sets;

wherein the one or more software programs when executed by at least one processing device of the processing platform further cause the processing device:

in generating the data set similarity measures, to semantically examine the given data set using one or more semantic considerations derived from a semantic hierarchy of data sets and relationships to identify similar data sets; and in generating the valuation measures, to generate, for the given data set, a valuation index, the valuation index being generated based at least in part on the given data set and domain-aware tokens associated with the given data set, each of the domain-aware tokens being generated for a corresponding context of interest and comprising information relating to one or more other ones of the data sets that are determined via the semantic examination to be similar to the given data set; and in generating the valuation measures, to determine valuation measures for the given data set by evaluating the valuation index using one or more changing context factors;

wherein the processing platform implements at least a portion of a data lake providing one or more of the plurality of data sets; and wherein at least one of the data sets comprises an external data set not yet imported into the data lake and further wherein import of the at least one data set into the data lake is controlled based at least in part on its associated valuation measure.

17. The computer program product of claim 16 wherein generating data set similarity measures comprises utilizing valuation measures previously assigned to respective ones of the data sets to generate one or more of the data set similarity measures.

18. The computer program product of claim 16 wherein generating valuation measures comprises combining previously-determined valuation measures of data sets that are determined via the semantic examination to be similar to the given data set by aggregating the valuation measures using associated weights.

19. The computer program product of claim 16 wherein at least portions of the semantic hierarchy are adjusted over time through machine learning based at least in part on user interaction with particular data sets and their valuation measures.

20. The computer program product of claim 16 wherein a given valuation measure for the given data set is generated responsive to a received data set valuation request identifying the given data set and values for the one or more changing context factors.

* * * * *